(12) United States Patent
Zheng et al.

(10) Patent No.: US 12,334,596 B2
(45) Date of Patent: Jun. 17, 2025

(54) BATTERY ASSEMBLY AND ELECTRONIC DEVICE

(71) Applicant: BEIJING XIAOMI MOBILE SOFTWARE CO., LTD., Beijing (CN)

(72) Inventors: Hongbin Zheng, Beijing (CN); Shuaipeng Xi, Beijing (CN); Jinhu Zhang, Beijing (CN); Lingli Han, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 179 days.

(21) Appl. No.: 17/331,484

(22) Filed: May 26, 2021

(65) Prior Publication Data

US 2022/0052426 A1 Feb. 17, 2022

(30) Foreign Application Priority Data

Aug. 11, 2020 (CN) .......................... 202010800568.7

(51) Int. Cl.
*H01M 50/533* (2021.01)
*H01M 10/613* (2014.01)
(Continued)

(52) U.S. Cl.
CPC ....... *H01M 50/533* (2021.01); *H01M 10/613* (2015.04); *H01M 10/623* (2015.04); *H01M 10/647* (2015.04); *H01M 10/653* (2015.04); *H01M 10/654* (2015.04); *H01M 10/6551* (2015.04); *H01M 10/6553* (2015.04); *H01M 10/6554* (2015.04); *H01M 10/658* (2015.04);
(Continued)

(58) Field of Classification Search
None
See application file for complete search history.

(56) References Cited

U.S. PATENT DOCUMENTS

2011/0008666 A1* 1/2011 Yoon ................. H01M 10/6554
429/120
2013/0115506 A1* 5/2013 Wayne ............... H01M 10/613
429/120
(Continued)

FOREIGN PATENT DOCUMENTS

CN 209434258 U 9/2019
CN 210837924 U 6/2020
(Continued)

OTHER PUBLICATIONS

Machine English translation of JP-2017168183-A originally published to Nishida Sep. 2017 (Year: 2017).*
(Continued)

*Primary Examiner* — Ula C Ruddock
*Assistant Examiner* — Mary Grace Byram
(74) *Attorney, Agent, or Firm* — Cozen O'Connor

(57) ABSTRACT

A battery assembly, and an electronic device incorporating a battery assembly, includes at least one cell, a battery protection plate and a heat dissipation assembly. The cell includes a cell body and a tab protruding from the cell body. The battery protection plate connected with the tab. The heat dissipation assembly connected with the tab and the battery protection plate, and the heat dissipation assembly includes a phase-change material for absorbing heat.

9 Claims, 5 Drawing Sheets

(51) Int. Cl.

| | | |
|---|---|---|
| *H01M 10/623* | (2014.01) | |
| *H01M 10/647* | (2014.01) | |
| *H01M 10/653* | (2014.01) | |
| *H01M 10/654* | (2014.01) | |
| *H01M 10/6551* | (2014.01) | |
| *H01M 10/6553* | (2014.01) | |
| *H01M 10/6554* | (2014.01) | |
| *H01M 10/658* | (2014.01) | |
| *H01M 10/659* | (2014.01) | |
| *H01M 50/105* | (2021.01) | |
| *H01M 50/178* | (2021.01) | |
| *H01M 50/287* | (2021.01) | |
| *H01M 50/503* | (2021.01) | |
| *H01M 50/505* | (2021.01) | |
| *H01M 50/519* | (2021.01) | |
| *H01M 50/534* | (2021.01) | |
| *H01M 50/54* | (2021.01) | |
| *H01M 50/557* | (2021.01) | |
| *H01M 10/42* | (2006.01) | |
| *H01M 50/55* | (2021.01) | |

(52) U.S. Cl.
CPC ....... *H01M 10/659* (2015.04); *H01M 50/105* (2021.01); *H01M 50/178* (2021.01); *H01M 50/287* (2021.01); *H01M 50/503* (2021.01); *H01M 50/505* (2021.01); *H01M 50/519* (2021.01); *H01M 50/534* (2021.01); *H01M 50/54* (2021.01); *H01M 50/557* (2021.01); *H01M 10/425* (2013.01); *H01M 50/55* (2021.01); *H01M 2220/30* (2013.01)

(56) References Cited

U.S. PATENT DOCUMENTS

| | | | | |
|---|---|---|---|---|
| 2014/0090780 | A1* | 4/2014 | Jeong | H01M 50/178 156/274.4 |
| 2015/0255836 | A1* | 9/2015 | Kim | H01M 10/63 165/80.2 |
| 2016/0359211 | A1* | 12/2016 | Kenney | H01M 10/6557 |
| 2018/0175346 | A1* | 6/2018 | Schmid-Schoenbein | H01M 50/121 |
| 2020/0144572 | A1 | 5/2020 | Lee et al. | |

FOREIGN PATENT DOCUMENTS

| | | | | | |
|---|---|---|---|---|---|
| JP | | 2017168183 A | * | 9/2017 | ............ H01M 2/02 |
| WO | WO-2018084424 A1 | | * | 5/2018 | ............ H01M 2/10 |

OTHER PUBLICATIONS

Machine English translation of WO2018084424A1 originally published to Lee May 11, 2018 (Year: 2018).*

European Patent Application No. 21176803.1 extended Search and Opinion dated Dec. 2, 2021, 7 pages.

Chinese Patent Application No. 202010800568.7, Office Action dated Aug. 10, 2023, 7 pages.

Chinese Patent Application No. 202010800568.7, English translation of Office Action dated Aug. 10, 2023, 13 pages.

* cited by examiner

BATTERY ASSEMBLY AND ELECTRONIC DEVICE

CROSS-REFERENCE TO RELATED APPLICATIONS

The present disclosure is based on and claims priority to Chinese Patent Application No. 202010800568.7, filed on Aug. 11, 2020, the entire content of which is incorporated herein by reference.

TECHNICAL FIELD

The present disclosure relates to a technical field of electronic devices, and more particularly, to a battery assembly and an electronic device.

BACKGROUND

At present, a mobile phone, a tablet computer, a laptop computer and other electronic devices mostly use a battery assembly as a power supply source. With the people's demand for fast charging, a relatively high charging power is needed to charge cells of the battery assembly. However, it is easy to cause the battery assembly to heat and thus a charging current need to be reduced, which affects charging efficiency. Based on this, it is necessary to dissipate heat of the battery assembly to improve the charging efficiency.

SUMMARY

The present disclosure provides an improved battery assembly and an electronic device.

A first aspect of the present disclosure provides a battery assembly, which includes at least one cell including a cell body and a tab protruding from the cell body; a battery protection plate connected with the tab; and a heat dissipation assembly connected with the tab and the battery protection plate, and the heat dissipation assembly includes a phase-change material for absorbing heat.

Another aspect of the present disclosure provides an electronic device, which includes a body and a battery assembly. The body is provided with a battery compartment. The battery assembly includes at least one cell, a battery protection plate and a heat dissipation assembly. The cell includes a cell body and a tab protruding from the cell body. The battery protection plate is connected with the tab. The heat dissipation assembly is connected with the tab and the battery protection plate, and the heat dissipation assembly includes a phase-change material for absorbing heat. The battery assembly is assembled in the battery compartment.

DETAILED DESCRIPTION

Exemplary embodiments of the present disclosure will be described in details herein, and the examples thereof are illustrated in the accompanying drawings. When the description below concerns the drawings, same numbers in different drawings represent same or similar elements unless indicated otherwise. In the following exemplary embodiments, the embodiments illustrated do not represent all embodiments consistent with the present disclosure. Instead, they are merely examples of devices and methods consistent with some aspects of the present disclosure as detailed in the appended claims.

The terms used in the present disclosure are merely to describe specific embodiments, which are not intended to limit the present disclosure. Unless defined otherwise, the technical or scientific terminologies used in the present disclosure shall be the general meaning understood by those skilled in the related art of the present disclosure. Terms such as "first", "second" and the like used in the descriptions and claims of the present disclosure do not indicate any order, quantity or importance, but are only used to distinguish different components. Similarly, terms such as "one" or "a" do not refer to quantity limitation, but to indicate the existence of at least one. Unless specified otherwise, terms such as "comprise" or "including" and the like mean that the elements or objects presented before "comprise" or "including" contain the elements or objects presented after "comprise" or "including" and their equivalents, which do not exclude other elements or objects. The terms "mounted," "connected," and the like are not restricted to physical or mechanical connections, may also be electrical connections, no matter direct or indirect.

As used in the descriptions and the appended claims of the present disclosure, "a" "said" and "the" in singular forms mean including plural forms, unless clearly indicated in the context otherwise. It should also be understood that, as used herein, the term "and/or" represents and contains any and all possible combinations of one or more associated listed items.

Figure 1:
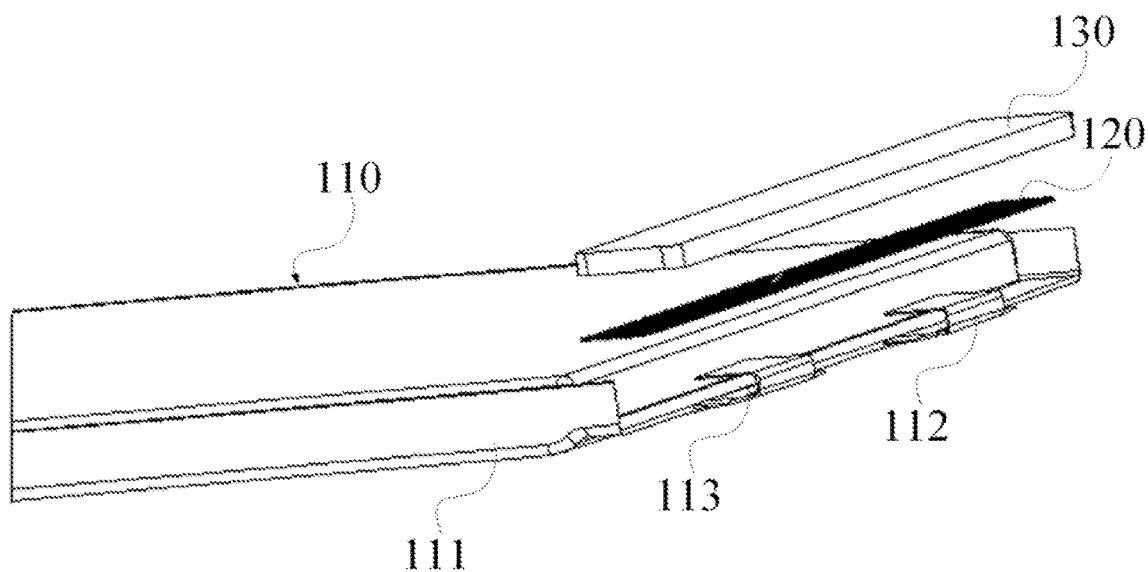
FIG. 1 illustrates an exploded view of a battery assembly illustrated in an exemplary embodiment.
Figure 2:
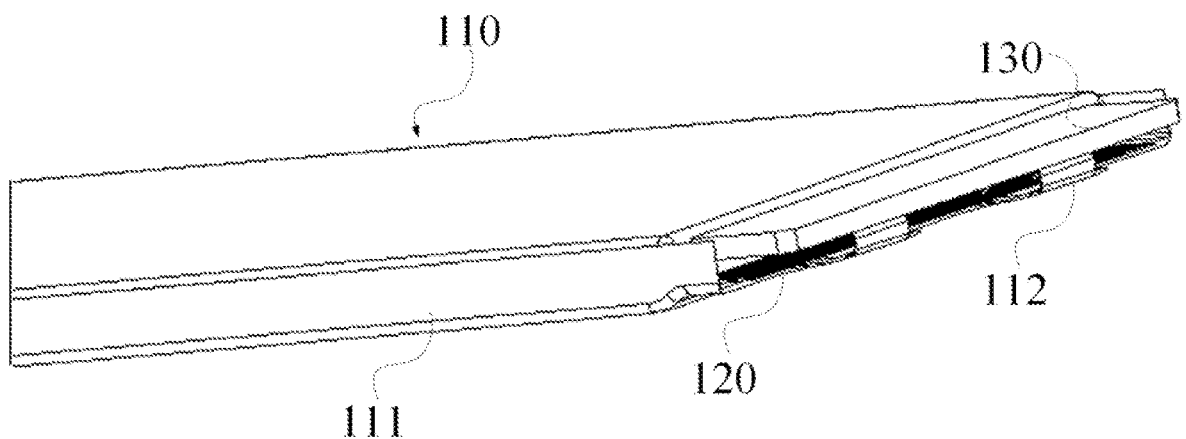
FIG. 2 illustrates a schematic view of the assembled battery assembly provided in FIG. 1.

FIG. 1 illustrates an exploded view of a battery assembly illustrated in an exemplary embodiment, and FIG. 2 illustrates a schematic view of the assembled battery assembly provided in FIG. 1. Referring to FIGS. 1 and 2, the battery assembly includes a cell 110, a fixation tape 120 and a battery protection plate 130. The cell 110 includes a cell body 111 and two tabs 112 protruding from the cell body 111. Each tab 112 is bent towards the cell body 111 and defines a gap 113. The fixation tape 120 is adhered to the gap 113 and is also adhered to the battery protection plate 130. When the cell 110 is charged with a relatively high charging power, the tab 112 and the battery protection plate 130 are easy to generate heat, which causes a temperature rise of the tab 112 and the battery protection plate 130. Due to a temperature limit, a low current is needed to charge the cell 110, which affects the charging efficiency and is not conducive to improving the user experience. Moreover, the temperature rise of the battery assembly will increase a local temperature of the electronic device, which is not conducive to improving the user experience, either.

In order to solve the above problems, the embodiments of the present disclosure provide a battery assembly and an electronic device, which are described below in combination with the attached drawings.

Figure 10:
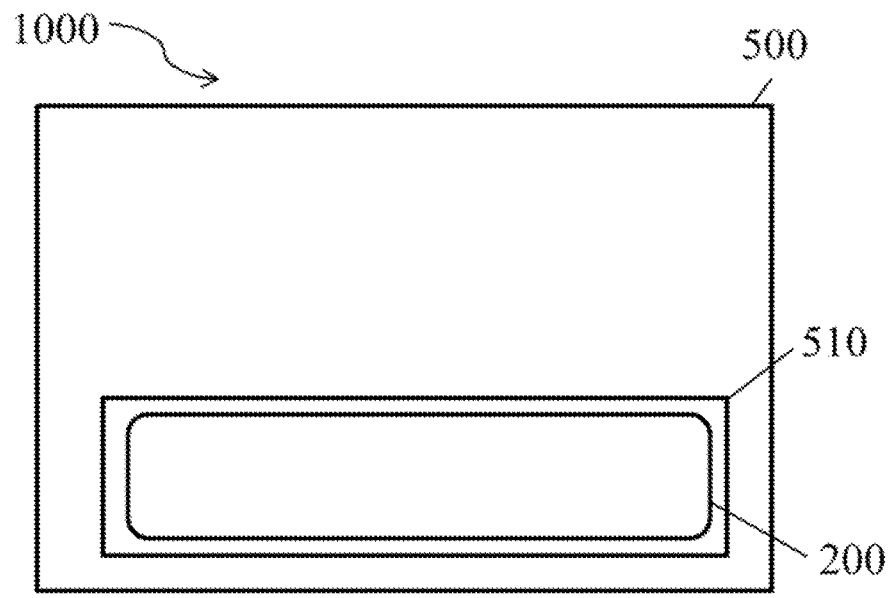
FIG. 10 is a schematic view of an electronic device according to an exemplary embodiment of the present disclosure.

As illustrated in FIG. 10, the electronic device 1000 provided by the embodiments of the present disclosure includes a battery assembly 200. The electronic device 1000 may include a body 500, the body 500 is provided with a battery compartment 510, and the battery assembly 200 is assembled in the battery compartment 510 to supply power for the electronic device 1000.

The electronic device provided by embodiments of the present disclosure includes, but is not limited to, a mobile phone, a tablet computer, an iPad, a digital broadcasting terminal, a message receiving and sending device, a game console, a medical facility, a fitness facility, a personal digital assistant, an intelligent wearable device, an intelligent television, etc.

Figure 3:
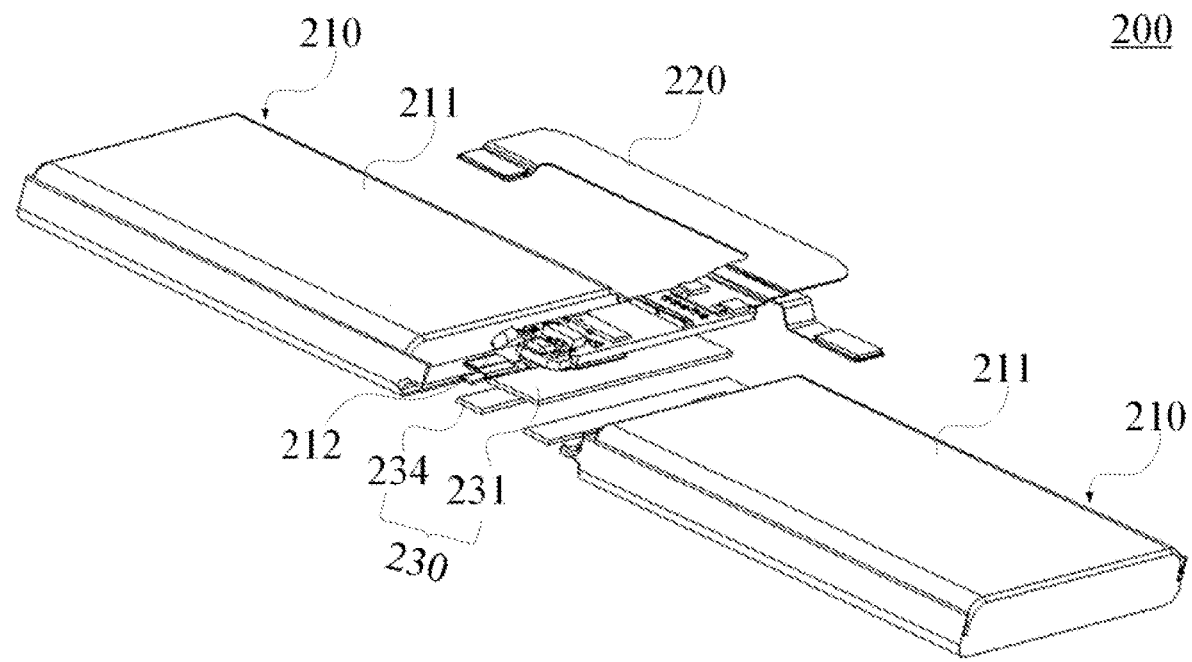
FIG. 3 illustrates an exploded view of a battery assembly according to an exemplary embodiment of the present disclosure.
Figure 4:
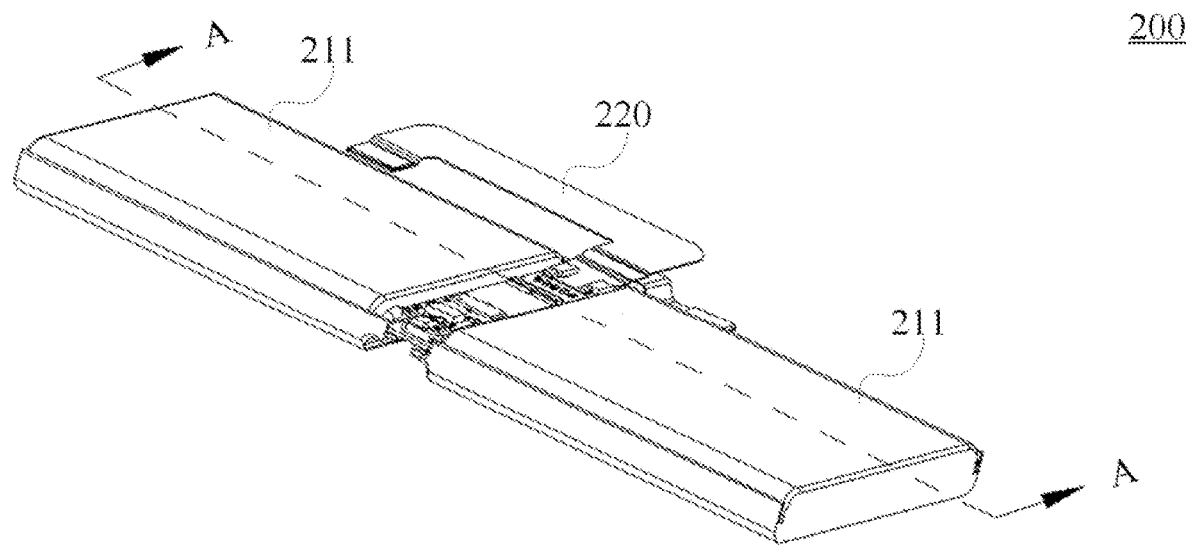
FIG. 4 illustrates a schematic view of the assembled battery assembly provided in FIG. 3.
Figure 5:
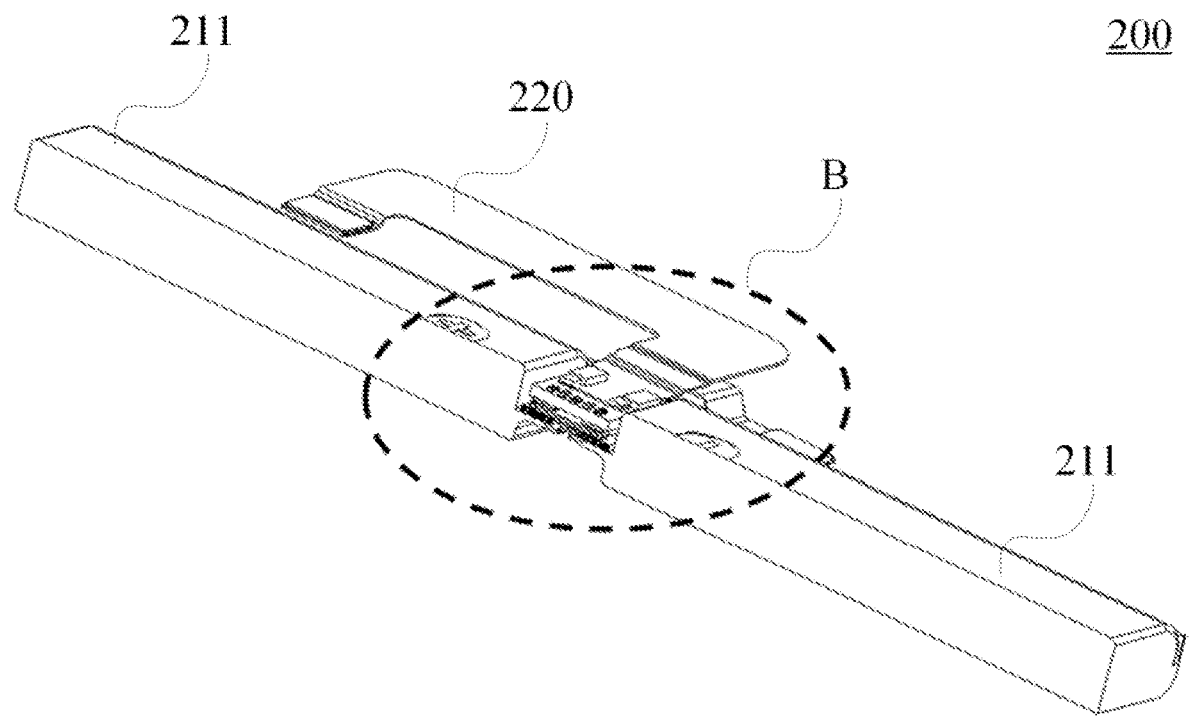
FIG. 5 illustrates a sectional view of the battery assembly provided in FIG. 4 along line A-A.
Figure 6:
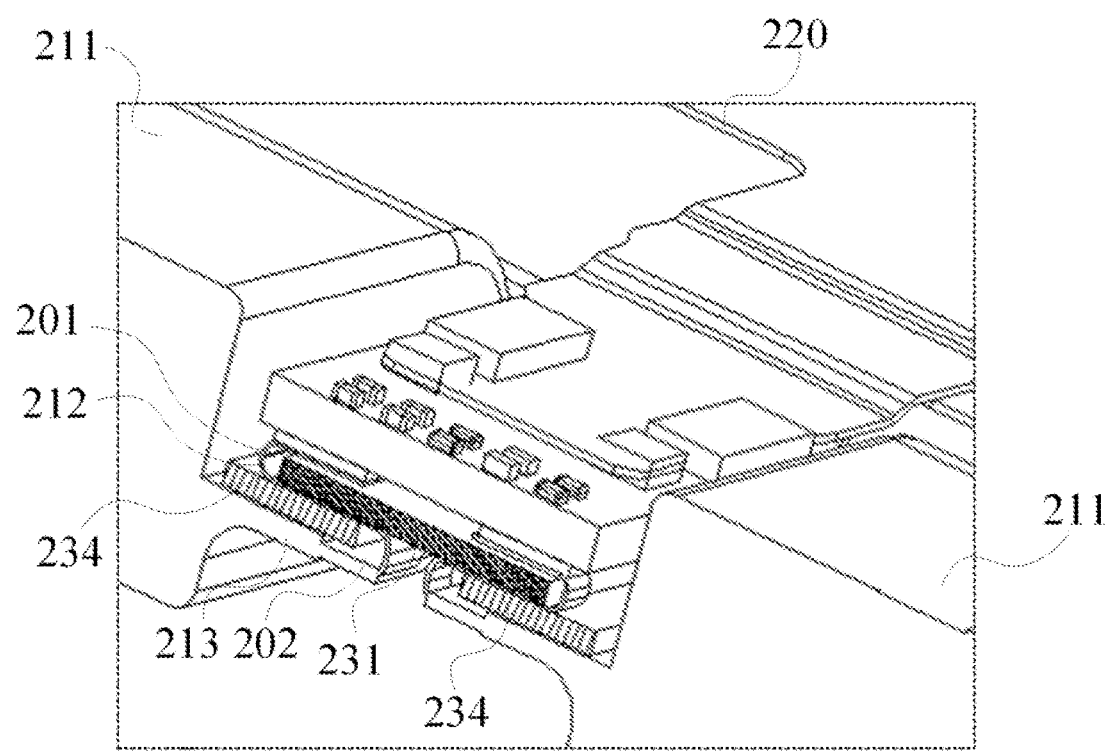
FIG. 6 illustrates a partially enlarged view of part B in FIG. 5.

FIG. 3 illustrates an exploded view of a battery assembly according to an exemplary embodiment of the present disclosure, FIG. 4 illustrates a schematic view of the assembled battery assembly provided in FIG. 3; FIG. 5 illustrates a sectional view of the battery assembly provided in FIG. 4 along line A-A, FIG. 6 illustrates a partially enlarged view of part B in FIG. 5. Referring to FIGS. 3 to 6, a battery assembly 200 includes at least one cell 210, a battery protection plate 220, and a heat dissipation assembly 230.

The cell 210 includes a cell body 211 and a tab 212 protruding from the cell body 211. In the embodiment of the present disclosure, there may be one or a plurality of cells 210. When a plurality of cells 210 are provided, the matching relationship of the tab 212 with the battery protection plate 220 and the heat dissipation assembly 230 of each cell 210 is identical.

The battery protection plate 220 is connected with the tab 212. In this way, the battery protection plate 220 charges the cell body 211 via the tab 212. The battery protection plate 220 may avoid the problems of over-current and over-voltage, so as to ensure the safe charging of the cell body 211.

The heat dissipation assembly 230 is connected with the tab 212 and the battery protection plate 220, and the heat dissipation assembly 230 includes a phase-change material for absorbing heat. The heat generated by the tab 212 and the battery protection plate 220 due to the charging and discharging is absorbed by the heat dissipation assembly 230, so as to reduce the temperature of the tab 212 and the battery protection plate 220, which is conducive to charging the cell body 211 with a relatively high current, so as to achieve fast charging. Exemplarily, the phase-change material includes paraffin, a mixture of paraffin and other substances or other substances, etc. Taking the paraffin as an example, when the temperature is relatively high, the paraffin in a solid phase absorbs the heat and turns into a liquid phase, which is conductive to reducing the temperature of the tab 212 and the battery protection plate 220.

Based on the above, in the battery assembly 200 and the electronic device provided by the embodiments of the present disclosure, based on the connection of the heat dissipation assembly 230 with the tab 212 and the battery protection plate 220, the phase-change material in the heat dissipation assembly 230 may absorb the heat of the tab 212 and the battery protection plate 220 to reduce the temperature of the battery assembly 200, which is conducive to charging the battery assembly 200 with a relatively high current, thereby improving the charging efficiency and the user experience. In addition, it does not cause a local heating problem of electronic device and the user experience can be improved.

Figure 7:
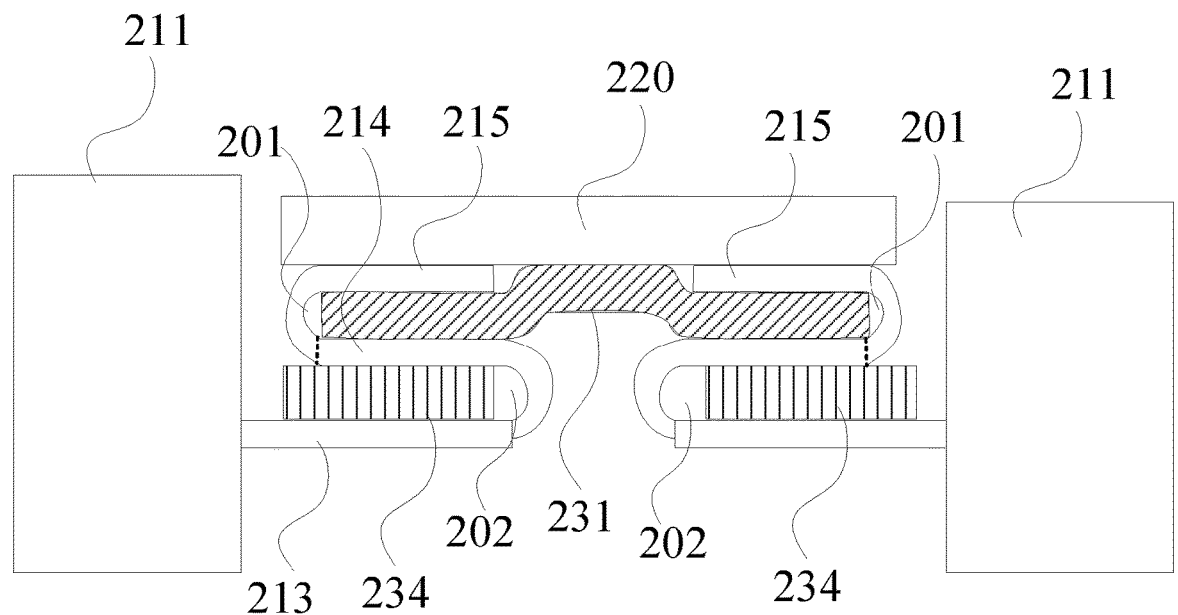
FIG. 7 illustrates a partially enlarged front view of part B in FIG. 5.

In order to better understand the battery assembly 200 provided by the embodiments of the present disclosure, a matching relationship between one cell 210 and other components is described as follows:

FIG. 7 illustrates a partially enlarged front view of part B in FIG. 5. In some embodiments, referring to FIGS. 6 and 7, the tab 212 includes a first tab portion 214 protruding from the cell body 211 and a second tab portion 215 connected to the first tab portion 214, the second tab portion 215 and the first tab portion 214 are relatively bent, and a first gap 201 is defined between the second tab portion 215 and the first tab portion 214. The heat dissipation assembly 230 includes a first heat dissipation body 231 passing through the first gap 201 and connected to the tab 212 and the battery protection plate 220. In this way, the first heat dissipation body 231 is not only conducive to firmly fixing the tab 212 with the battery protection plate 220, preventing the tab 212 from being pulled due to a displacement of the battery protection plate 220, avoiding the tab 212 from cracking or short circuit due to the displacement, but also effectively absorbing the heat of the tab 212 and the battery protection plate 220. Generally, the tab 212 can be bent, and the first heat dissipation body 231 occupies the first gap 201 defined by bending the tab 212, so as to avoid the tab 212 occupying other areas and wasting space, and the first heat dissipation body 231 is arranged in the first gap 201, which may also prevent the tab 212 from cracking due to excessive bending.

In some embodiments, a plurality of tabs 212 are provided, and the plurality of tabs 212 define a plurality of first gaps 201. The first heat dissipation body 231 extends through the plurality of first gaps 201. In other words, continuing to refer to FIGS. 3, 6 and 7, the first heat dissipation body 231 presents an elongate plate-shaped structure, which extends to the plurality of first gaps 201 and is connected with the tab 212 and the battery protection plate 220, or the first heat dissipation body arranged in the plurality of first gaps 201 is formed in one piece. Thus, it is conducive for the first heat dissipation body 231 to absorb more heat from the tab 212 and the battery protection plate 220, and it is conducive for the tab 212 to be firmly connected to the battery protection plate 220, which is convenient for assembly. Exemplarily, the number of the tabs 212 of each cell 210 is two, and the number of the first gaps 201 is two.

Figure 8:
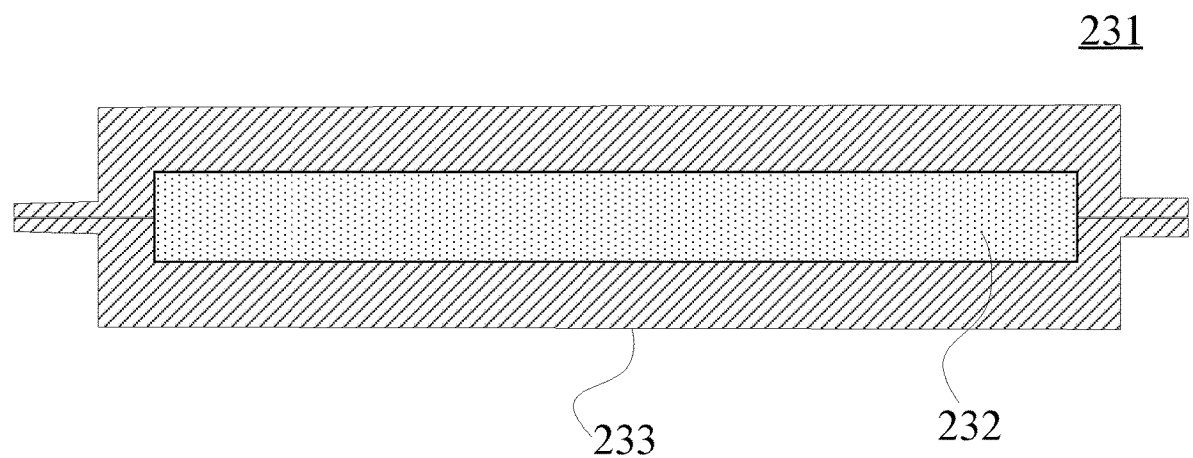
FIG. 8 is a schematic view of a first heat dissipation body according to an exemplary embodiment of the present disclosure.

FIG. 8 is a schematic view of a first heat dissipation body 231 according to an exemplary embodiment of the present disclosure. In some embodiments, referring to FIG. 8, the first heat dissipation body 231 includes a first phase-change material layer 232 formed by the phase-change material and a first thermal-conductive-insulating-adhesive layer 233 encapsulating the first phase-change material layer 232. The first thermal-conductive-insulating-adhesive layer 233 is adhered to the tab 212 and the battery protection plate 220. The heat enters the first phase-change material layer 232 through the first thermal-conductive-insulating-adhesive layer 233, and the first phase-change material layer 232 absorbs and stores the heat, so as to reduce the temperature of the tab 212 and the battery protection plate 220. When the first heat dissipation body 231 extends to the plurality of first gaps 201 and is connected to the tab 212 and the battery protection plate 220, the first thermal-conductive-insulating-adhesive layer 233 may quickly transfer the heat to the first phase-change material layer 232, and the heat is evenly distributed around by the first phase-change material layer 232, so as to effectively reduce the temperature of the tab 212 and the battery protection plate 220, which is conducive to improving the charging efficiency. In addition, the way of adhering and connecting the first heat dissipation body 231 with the tab 212 and the battery protection plate 220 is simple, which is convenient for assembly. Exemplarily, the material of the first thermal-conductive-insulating-adhesive layer 233 may be a thermal conductive silica gel material.

In some embodiments, referring to FIGS. 6 and 7, the cell body 211 includes an encapsulation area 213, the first tab portion 214 protrudes from the encapsulation area 213, the first tab portion 214 is bent towards the encapsulation area 213, the second tab portion 215 is bent away from the encapsulation area 213, and a second gap 202 is defined between the first tab portion 214 and the encapsulation area 213. The heat dissipation assembly 230 also includes a second heat dissipation body 234, and the second heat dissipation body 234 is arranged in the second gap. Thus, the second heat dissipation body 234 may not only absorb the heat of the tab 212 to reduce the temperature of the tab 212, but also improve the charging efficiency. Based on a thickness of the second heat dissipation body 234, the first tab portion 214 of the tab 212 may be prevented from cracking due to excessive bending.

In some embodiments, a plurality of tabs 212 are provided, and a plurality of second gaps 202 are defined between the plurality of tabs 212 and the encapsulation area 213, the second heat dissipation body 234 extends through the plurality of second gaps 202, and the second heat dissipation body 234 is connected with the first tab portion 214 and the encapsulation area 213. It should be noted that the encapsulation area 213 is formed by encapsulating a part of the tab 212 through an aluminum plastic film and a tab glue, such that the problem of the temperature rise also occurs at the encapsulation area 213. Exemplarily, continuing to refer to FIGS. 3, 6 and 7, the second heat dissipation body 234 presents a plate-shaped structure. Thus, by connecting the second heat dissipation body 234 with the encapsulation area 213 and the first tab portion 214, it is more conducive to effectively reducing the temperature of the encapsulation area 213 and the first tab portion 214, and the second heat dissipation body 234 extends through the plurality of second gaps 202, which is conducive to stably limiting the position of the tab 212 and avoiding the tab 212 from being displaced and excessively bent.

Figure 9:
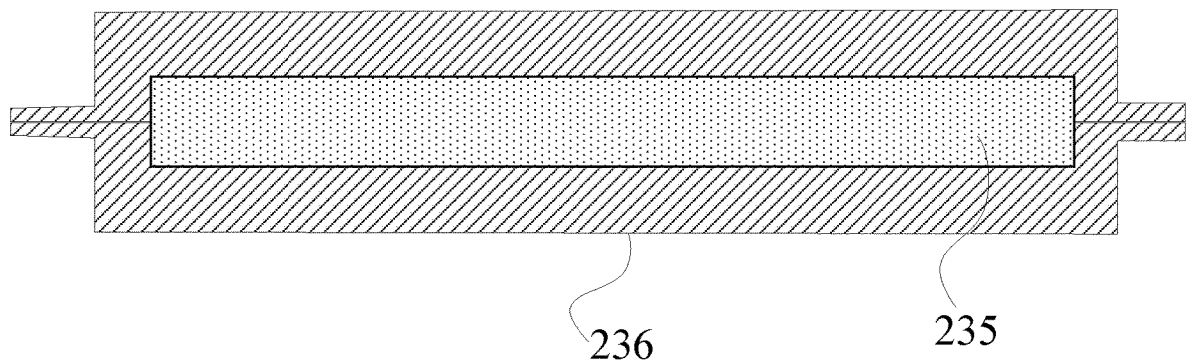
FIG. 9 is a schematic view of a second heat dissipation body according to an exemplary embodiment of the present disclosure.

FIG. 9 is a schematic view of a second heat dissipation body 234 according to an exemplary embodiment of the present disclosure. In some embodiments, referring to FIG. 9, the second heat dissipation body 234 includes a second phase-change material layer 235 formed by the phase-change material and a second thermal-conductive-insulating-adhesive layer 236 encapsulating the second phase-change material layer 235. The second thermal-conductive-insulating-adhesive layer 236 is adhered to the first tab portion 214 and the encapsulation area 213. The heat enters the second phase-change material layer 235 through the second thermal-conductive-insulating-adhesive layer 236, and the second phase-change material layer 235 absorbs and stores the heat, so as to reduce the temperature of the tab 212 and the encapsulation area 213. In addition, the way of adhering and connecting the second heat dissipation body 234 with the tab 212 and the encapsulation area 213 is simple, which is convenient for assembly. Exemplarily, the material of the second thermal-conductive-insulating-adhesive layer 236 may be a thermal conductive silica gel material. Exemplarily, the second heat dissipation body 234 may present a plate-shaped structure, as illustrated in FIG. 3. Thus, the heat is absorbed by the second thermal-conductive-insulating-adhesive layer 236 and the heat is evenly distributed around by the second thermal-conductive-insulating-adhesive layer 236, so as to quickly reduce the temperature of the tab 212 and the encapsulation area 213.

In the embodiments of the present disclosure, the structure of any one of the above battery assembly 200 is applicable to the battery assembly 200 including one cell 210, and is also applicable to the battery assembly 200 including a plurality of cells 210. In some embodiments, referring to FIGS. 3, 4 and 5, the battery assembly 200 includes at least two cells 210, the at least two cells 210 share one battery protection plate 220, and at least two first heat dissipation bodies 231 corresponding to the at least two cells 210 connected to the identical battery protection plate 220 are formed in one piece. Thus, the first heat dissipation body 231 effectively leads to a firm connection between the plurality of cells 210 and the battery protection plate 220, and effectively dissipates the heat for the tab 212 and the battery protection plate 220.

In some embodiments, the battery assembly 200 includes a first cell and a second cell. For ease of description, the cell 210 on a left side in FIGS. 3 to 7 is used as the first cell, and the cell 210 on a right side is used as the second cell. The tab 212 of the first cell and the tab 212 of the second cell are opposite and connected with the identical battery protection plate 220. The first heat dissipation body 231 of the first cell and the first heat dissipation body 231 of the second cell are formed in one piece, and the first heat dissipation body 231 is also connected with the battery protection plate 220. Thus, the first heat dissipation body 231 not only dissipates the heat for the tab 212 of the first cell, the tab 212 of the second cell and the battery protection plate 220, but also is conducive to firm fixing among them. Moreover, the first heat dissipation body 231 extends to the first gap 201 of the tab 212 of the first cell and the first gap 201 of the tab 212 of the second cell, and the first heat dissipation body 231 is connected with the battery protection plate 220, such that the first heat dissipation body presents a plate-shaped structure, which is conducive for the first heat dissipation body 231 to absorb the heat of the tab 212 and the battery protection plate 220 and evenly distribute the heat to each position of the first heat dissipation body, so as to be further conducive to quickly reducing the temperature of the tab 212 and the battery protection plate 220, and improving the charging efficiency.

In addition, the second gap 202 is defined between the tab 212 of the first cell and the encapsulation area 213, and a second gap 202 is defined between the tab 212 of the second cell and the encapsulation area 213. The second heat dissipation body 234 arranged in the second gap 202 of the first cell and the second heat dissipation body 234 arranged in the second gap 202 of the second cell may be separated, which is convenient for the assemblies between the second heat dissipation body 234 and the first cell, and between the second heat dissipation body 234 and the second cell. In addition, other structures with regard to the first cell and the second cell may refer to any one of the above embodiments. The dimensions of the first cell and the second cell may be identical or different, and the first cell and the second cell may be arranged on an identical plane or different planes, this is not limited by the present disclosure.

Exemplarily, referring to FIG. 4, at least one board surface of the first cell and at least one board surface of the second cell are arranged on an identical plane.

To sum up, in the battery assembly 200 and the electronic device provided by the embodiments of the present disclosure, the first heat dissipation body 231 is arranged in the first gap 201 of the tab 212, and the first heat dissipation body 231 is connected with the battery protection plate 220 to firmly fix the tab 212 and the battery protection plate 220, so as to prevent the tab 212 from the displacement and short circuit. The second heat dissipation body 234 is arranged in the second gap 202 defined by the tab 212 and the encapsulation area 213, so as to prevent the tab 212 from being excessively bent and cracked, resulting in a failure of power transmission. The first heat dissipation body 231 includes a phase-change material, and the first heat dissipation body 231 extends through a plurality of first gaps 201, the first heat dissipation body 231 may absorb more heat and the heat is evenly distributed around, which is conducive to reducing the temperature of the tab 212 and the battery protection plate 220. The second heat dissipation body 234 includes a phase-change material, and the second heat dissipation body 234 extends through a plurality of second gaps 202, the second heat dissipation body 234 may absorb more heat and the heat is evenly distributed around, which is conducive to reducing the temperature of the tab 212. Through the battery assembly 200, the temperature may be reduced, the charging efficiency may be improved, and the user experience may be improved.

The above embodiments of the present disclosure may be complementary for each other under the case of no conflict.

The above description is only a preferable embodiment of the present disclosure, which is not construed to limit the present disclosure. Any modification, equivalent replacement, improvement made within the spirit and principle of the present disclosure should be included in the protection scope of the present disclosure.

What is claimed is:

1. A battery assembly, comprising:
at least one cell comprising a cell body and a tab protruding from the cell body;
a battery protection plate connected with the tab and configured to charge the cell body via the tab to avoid over-current and over-voltage; and
a heat dissipation assembly directly connected with the tab and the battery protection plate, the heat dissipation assembly comprising a phase-change material for absorbing heat and configured to absorb heat generated by the tab and the battery protection plate due to charging and discharging,
wherein the tab comprises a first tab portion protruding from the cell body and a second tab portion connected to the first tab portion, the second tab portion and the first tab portion are bent, and the second tab portion and the first tab portion defines a first gap therebetween; the heat dissipation assembly comprises a first heat dissipation body passing through the first gap and connected to the tab and the battery protection plate;
wherein the cell body comprises an encapsulation area, the first tab portion protrudes from the encapsulation area, the first tab portion is bent towards the encapsulation area, the second tab portion is bent away from the encapsulation area, and the first tab portion and the encapsulation area define a second gap therebetween; the heat dissipation assembly further comprises a second heat dissipation body arranged in the second gap;
wherein the first heat dissipation body comprises a first phase-change material layer formed by the phase-change material and a first thermal-conductive-insulating-adhesive layer encapsulating the first phase-change material layer, and the first thermal-conductive-insulating-adhesive layer is adhered to the tab and the battery protection plate; the first heat dissipation body presents an elongated plate-shaped structure; the first thermal-conductive-insulating-adhesive layer comprises a thermal conductive silica gel material,
wherein the second heat dissipation body comprises a second phase-change material layer formed by the phase-change material and a second thermal-conductive-insulating-adhesive layer encapsulating the second phase-change material layer, and the second thermal-conductive-insulating-adhesive layer is adhered to the first tab portion and the encapsulation area; the second heat dissipation body presents a plate-shaped structure; wherein the second thermal-conductive-insulating-adhesive layer comprises a thermal conductive silica gel material,
wherein the battery assembly comprises a first cell and a second cell, a tab of the first cell and a tab of the second cell are opposite to each other and connected with the battery protection plate, and the first heat dissipation body of the first cell and the first heat dissipation body of the second cell are formed in one piece,
wherein at least one board surface of the first cell and at least one board surface of the second cell are arranged on an identical plane, and
wherein an opening of the first gap of the first cell and an opening of the first gap of the second cell face each other in an extending direction of the tab, two ends of the first heat dissipation body are extended into the first gap of the first cell and the first gap of the second cell, respectively, and a middle portion of the first heat dissipation body in the extending direction of the tab is in contact with and connected to the battery protection plate.

2. The battery assembly according to claim 1, wherein a plurality of tabs are provided, the plurality of tabs define a plurality of first gaps, and the first heat dissipation body extends through the plurality of first gaps.

3. The battery assembly according to claim 1, wherein a plurality of tabs are provided, and the plurality of tabs and the encapsulation area define a plurality of second gaps therebetween, the second heat dissipation body extends through the plurality of second gaps, and the second heat dissipation body is connected with the first tab portion and the encapsulation area.

4. The battery assembly according to claim 1, wherein the phase-change material comprises paraffin.

5. The battery assembly according to claim 1, wherein the encapsulation area is formed by encapsulating a part of the tab through an aluminum plastic film and a tab glue.

6. The battery assembly according to claim 1, wherein
the second heat dissipation body arranged in the second gap of the first cell is separated from the second heat dissipation body arranged in the second gap of the second cell.

7. The battery assembly according to claim 1, wherein dimensions of the first cell and the second cell are identical or different.

8. A battery assembly, comprising:
a cell comprising a cell body and a tab protruding from the cell body;

a battery protection plate connected with the tab and configured to charge the cell body via the tab to avoid over-current and over-voltage; and a heat dissipation assembly directly connected with the tab and the battery protection plate, and the heat dissipation assembly comprising a phase-change material for absorbing heat and configured to absorb heat generated by the tab and the battery protection plate due to charging and discharging, wherein the tab is bent to define a gap, and the heat dissipation assembly is arranged in the gap, wherein the tab comprises a first tab portion protruding from the cell body and a second tab portion connected to the first tab portion, the second tab portion and the first tab portion are bent, and the second tab portion and the first tab portion defines a first gap therebetween; the heat dissipation assembly comprises a first heat dissipation body passing through the first gap and connected to the tab and the battery protection plate;

wherein the cell body comprises an encapsulation area, the first tab portion protrudes from the encapsulation area, the first tab portion is bent towards the encapsulation area, the second tab portion is bent away from the encapsulation area, and the first tab portion and the encapsulation area define a second gap therebetween; the heat dissipation assembly further comprises a second heat dissipation body arranged in the second gap;

wherein the first heat dissipation body comprises a first phase-change material layer formed by the phase-change material and a first thermal-conductive-insulating-adhesive layer encapsulating the first phase-change material layer, and the first thermal-conductive-insulating-adhesive layer is adhered to the tab and the battery protection plate; the first heat dissipation body presents an elongated plate-shaped structure; the first thermal-conductive-insulating-adhesive layer comprises a thermal conductive silica gel material, wherein the second heat dissipation body comprises a second phase-change material layer formed by the phase-change material and a second thermal-conductive-insulating-adhesive layer encapsulating the second phase-change material layer, and the second thermal-conductive-insulating-adhesive layer is adhered to the first tab portion and the encapsulation area; the second heat dissipation body presents a plate-shaped structure; wherein the second thermal-conductive-insulating-adhesive layer comprises a thermal conductive silica gel material, wherein the battery assembly comprises a first cell and a second cell, a tab of the first cell and a tab of the second cell are opposite to each other and connected with the battery protection plate, and the first heat dissipation body of the first cell and the first heat dissipation body of the second cell are formed in one piece, and wherein at least one board surface of the first cell and at least one board surface of the second cell are arranged on an identical plane, and wherein an opening of the first gap of the first cell and an opening of the first gap of the second cell face each other in an extending direction of the tab, two ends of the first heat dissipation body are extended into the first gap of the first cell and the first gap of the second cell, respectively, and a middle portion of the first heat dissipation body in the extending direction of the tab is in contact with and connected to the battery protection plate.

9. An electronic device, comprising:
a body provided with a battery compartment; and
a battery assembly comprising:
 at least one cell comprising a cell body and a tab protruding from the cell body,
 a battery protection plate connected with the tab and configured to charge the cell body via the tab to avoid over-current and over-voltage, and
 a heat dissipation assembly directly connected with the tab and the battery protection plate, and the heat dissipation assembly comprising a phase-change material for absorbing heat and configured to absorb heat generated by the tab and the battery protection plate due to charging and discharging;
wherein the battery assembly is assembled in the battery compartment,
wherein the tab comprises a first tab portion protruding from the cell body and a second tab portion connected to the first tab portion, the second tab portion and the first tab portion are bent, and the second tab portion and the first tab portion defines a first gap therebetween; the heat dissipation assembly comprises a first heat dissipation body passing through the first gap and connected to the tab and the battery protection plate;
wherein the cell body comprises an encapsulation area, the first tab portion protrudes from the encapsulation area, the first tab portion is bent towards the encapsulation area, the second tab portion is bent away from the encapsulation area, and the first tab portion and the encapsulation area define a second gap therebetween; the heat dissipation assembly further comprises a second heat dissipation body arranged in the second gap;
wherein the first heat dissipation body comprises a first phase-change material layer formed by the phase-change material and a first thermal-conductive-insulating-adhesive layer encapsulating the first phase-change material layer, and the first thermal-conductive-insulating-adhesive layer is adhered to the tab and the battery protection plate; the first heat dissipation body presents an elongated plate-shaped structure; the first thermal-conductive-insulating-adhesive layer comprises a thermal conductive silica gel material,
wherein the second heat dissipation body comprises a second phase-change material layer formed by the phase-change material and a second thermal-conductive-insulating-adhesive layer encapsulating the second phase-change material layer, and the second thermal-conductive-insulating-adhesive layer is adhered to the first tab portion and the encapsulation area; the second heat dissipation body presents a plate-shaped structure; wherein the second thermal-conductive-insulating-adhesive layer comprises a thermal conductive silica gel material,
wherein the battery assembly comprises a first cell and a second cell, a tab of the first cell and a tab of the second cell are opposite to each other and connected with the battery protection plate, and the first heat dissipation body of the first cell and the first heat dissipation body of the second cell are formed in one piece, and
wherein at least one board surface of the first cell and at least one board surface of the second cell are arranged on an identical plane, and
wherein an opening of the first gap of the first cell and an opening of the first gap of the second cell face each other in an extending direction of the tab, two ends of the first heat dissipation body are extended into the first gap of the first cell and the first gap of the second cell, respectively, and a middle portion of the first heat dissipation body in the extending direction of the tab is in contact with and connected to the battery protection plate.

* * * * *